Figure 1:
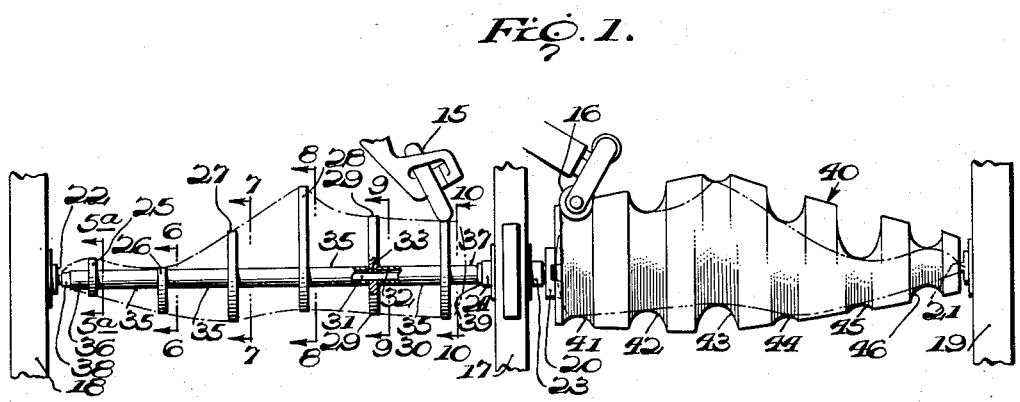

Jan. 19, 1954   B. D. SPENCER   2,666,464
METHOD OF MAKING LASTS

Filed Nov. 28, 1952   2 Sheets-Sheet 1

INVENTOR
Burdell D. Spencer.
BY
W. J. Eccleston
ATTORNEY

Jan. 19, 1954     B. D. SPENCER     2,666,464
METHOD OF MAKING LASTS
Filed Nov. 28, 1952     2 Sheets-Sheet 2
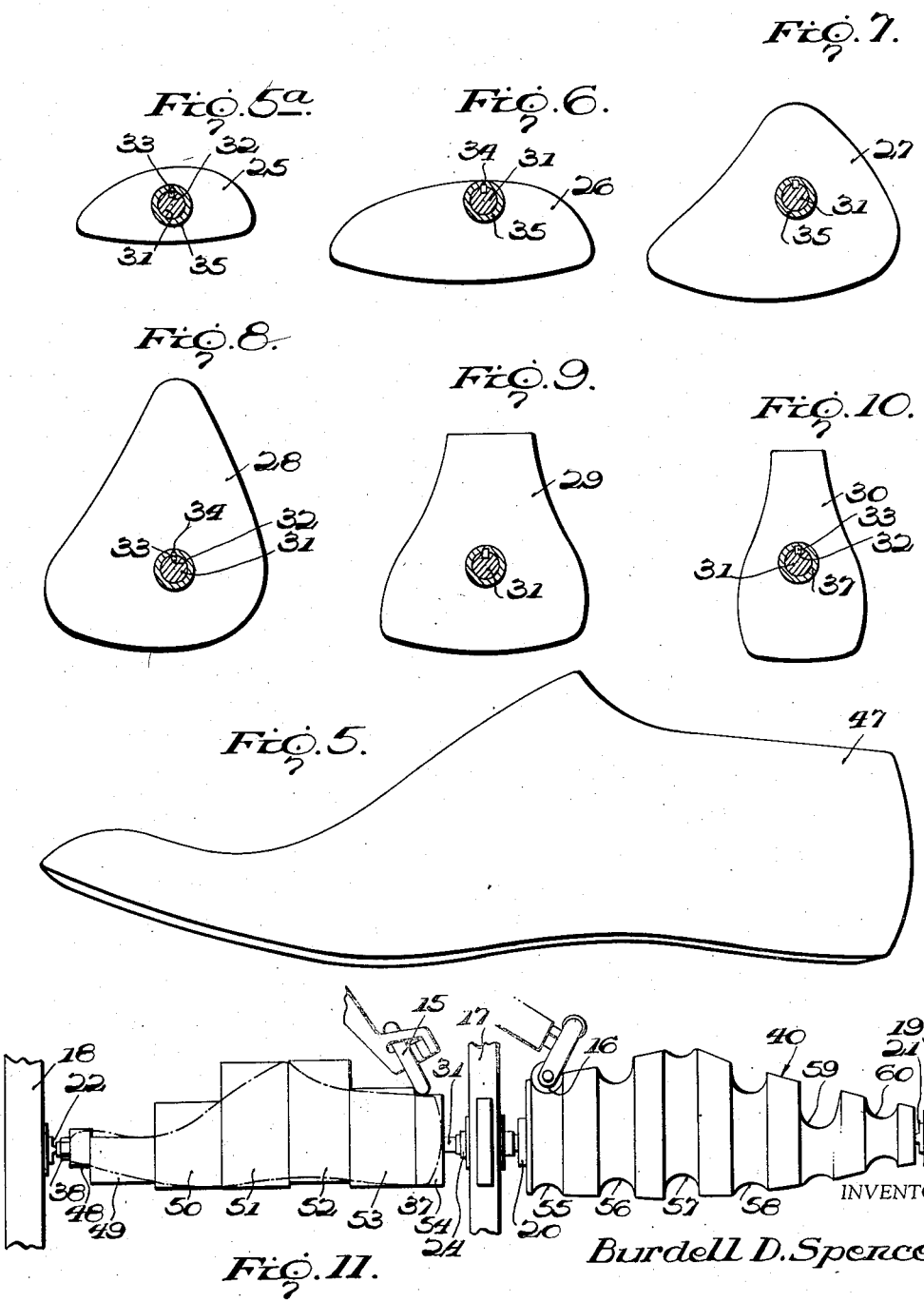

Patented Jan. 19, 1954

2,666,464

UNITED STATES PATENT OFFICE 2,666,464

METHOD OF MAKING LASTS

Burdell D. Spencer, Oxon Hill, Md.

Application November 28, 1952, Serial No. 323,171

2 Claims. (Cl. 144—309)

(Granted under Title 35, U. S. Code (1952), sec. 266)

The invention described herein, if patented, may be manufactured and used by or for the Government for governmental purposes, without the payment to me of any royalty thereon.

My invention relates to a method of making footwear lasts.

The usual procedure in the manufacturing of footwear lasts is to employ the services of a highly skilled master model last maker, who forms or carves the master model last from a solid block of wood or the like. The services of this highly skilled craftsman are very costly, and the design of the particular last stems largely from his personal experience and skill in the art, aided by various sources of dimensional data and style information which the particular last maker possesses. The finished master model last may prove very satisfactory, but there are certain disadvantages inherent in this method of making the master model last by hand. The foremost among these disadvantages is the lack of any definite or fixed scientific approach to the problem, and the resulting difficulty in establishing the exact shape of the last, particularly in cross section, at the several critical points on the last, such as the toe, ball, waist, heel, etc. The finished master model can, of course, be measured at various points, but initially in the design of the master model there is no accurate scientific approach in developing the shape at the critical points, other than the above mentioned personal skill of the craftsman, based largely upon experience.

In my method, the services of the master model last maker may be dispensed with entirely, and a simulated master model last may be accurately and scientifically designed at the drafting board, using known dimensional data to determine the shape of the last at several critical points thereon. The draftsman develops several critical cross sectional shapes for the simulated master model on the drafting board, such as the cross sectional shapes at the toe, ball, waist, heel, etc., and from these cross sectional shapes or profiles, a series of last sections or templets are made, which accurately correspond peripherally to the shape of the desired last at known longitudinal points upon the last. The last sections or templets are then assembled in spaced end to end relation about a common longitudinal axis through the templets, and the assembled last sections are then supported and turned in a copying lathe or the like, and there serve the purpose of the usual handmade master model last in the production of additional wooden last models, from which the final production last may be made.

When the assembled last sections or templets are thus used in the copying lathe to simulate the usual master model last, the lathe produces in the rough model block or cob a series of peripheral cuts which accurately establish the cross sectional shape of the last model being produced, at the several critical longitudinal points upon the same previously mentioned. It is then merely necessary to finish the last model in the lathe by cutting away or removing the material on the block or cob between the spaced peripheral cuts produced by the use of the assembled templets. The last models produced by this method are believed to be more scientifically accurate and more dimensionally correct for a given size of last than those models which would normally be produced where the handmade master model is used to guide the cutting tool in the copying lathe.

Additionally, the production of the wooden last models can be accomplished with the combined services of the drafting board designer and the ordinary copying lathe operator who need possess no particular skill or knowledge with respect to last making.

Accordingly, the main object of the invention is to provide a method of making improved last models from wood or the like in a copying lathe, from a simulated master model last which is extremely accurate at the desired number of critical points upon the last.

A further object is to provide a method of the above-mentioned character which is economical and time saving, and also easy to practice without the services of highly skilled craftsmen.

Other objects and advantages of the invention will be apparent during the course of the following description.

In the accompanying drawings, forming a part of this application, and in which like numerals are employed to designate like parts throughout the same, Figure 1 is a side elevation, partly diagrammatic of a wooden last model being turned in a copying lathe, which also utilizes a simulated master model last constructed in accordance with the present invention for guiding the follower element or model wheel of the copying lathe.

Figure 2:
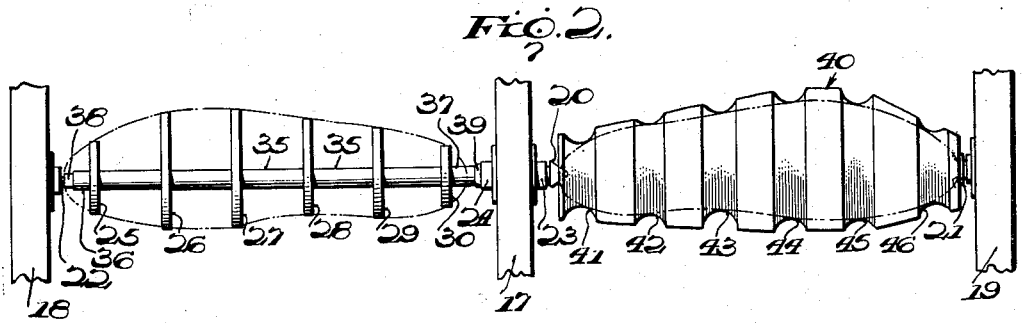
Figure 3:
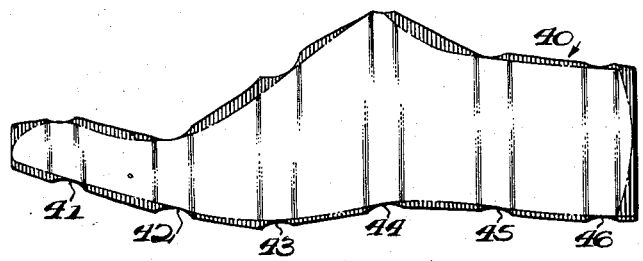
Figure 4:
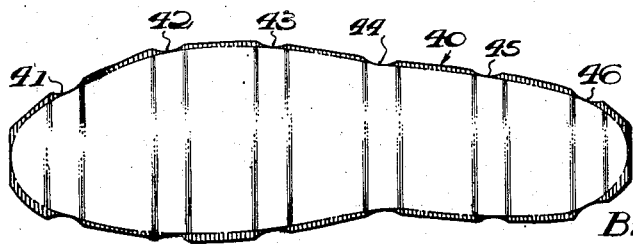

Figure 2 is a plan view, partly diagrammatic of the same,

Figure 3 is a side elevation of a partly finished last model made in accordance with my method, Figure 4 is a plan view of the same, Figure 5 is a side elevation of a finished last model made in accordance with the method, Figure 5a is a transverse vertical section on line 5a—5a of Figure 1, Figure 6 is a similar section on line 6—6 of Figure 1, Figure 7 is a similar section on line 7—7 of Figure 1, Figure 8 is a similar section on line 8—8 of Figure 1, Figure 9 is a similar section on line 9—9 of Figure 1, Figure 10 is a similar section on line 10—10 of Figure 1, and, Figure 11 is a side elevation partly diagrammatic of a last model being made in a copying lathe in accordance with a modification of my method.

In the drawings, where for the purpose of illustration are shown preferred embodiments of the invention, attention is directed first to Figures 1 to 10 inclusive, wherein the numerals 15 and 16, respectively, designate generally the follower element or model wheel and the cutter of a conventional copying lathe. Such a copying or last lathe is shown, for example, in Figure 1 of U. S. Patent No. 2,336,049, and as such forms no part of the present invention, and need not be described or shown in detail. The copying lathe includes the usual head stock 17 and tail stocks 18 and 19. A rotatable chuck 20 is journaled upon the head stock 17 for holding engagement with the last model to be formed in the lathe, and a pair of centers 21 and 22 are carried by the tail stocks 18 and 19 for engagement with the work to be turned in the lathe. The chuck 20 is rotatable with a spindle 23, journaled upon the head stock 17, and this spindle extends beyond both sides of the head stock and carries a second chuck or socket 24 for connection with the simulated master model last to be described. As previously stated, the construction of the last lathe is entirely conventional, and only sufficient elements of the lathe have been shown and described to permit a proper understanding of the method, insofar as the same is performed or practiced in connection with the lathe.

The simulated master model last comprises a plurality of flat last sections or plates 25, 26, 27, 28, 29 and 30 of metal or the like, and each of these last sections has a marginal or peripheral shape which has been accurately predetermined from given dimensional information at the drafting board. The individual last sections or plates accurately correspond peripherally to the cross sectional shape of the desired last model at a plurality of longitudinally spaced points upon the last, and it should be understood that in the practice of my method any desired number of the last sections or plates may be made up and assembled in a manner to be described for producing the simulated master model last. I prefer to practice the method by making the six last sections 25 to 30, which establish the cross sectional shape of the desired last model, at the six points upon the last which are generally considered to be critical, such as at the toe, ball, waist, heel, etc. When the last sections or plates corresponding to these critical points are employed, and additional last sections are used between the six critical sections, the accuracy of my method will be increased, as will be seen hereinafter, but it is believed to be unnecessary in the satisfactory practice of the method to ever use an unduly great number of last sections or templets. The last sections 25 to 30 may have any desired thickness, and it is preferred to make them relatively thin, as shown in the drawings, although thick enough to properly engage the model wheel 15.

At the drafting board, not only the marginal or peripheral shapes of the last sections 25 to 30 are determined, but also their theoretical centers with respect to the theoretical longitudinal axis of the last. At these centers, the last sections 25 to 30 are provided with axial openings for the reception of a single longitudinal rod or arbor 31, upon which all of the last sections 25 to 30 are mounted, at right angles thereto. The arbor 31 has a longitudinal keyway 32 formed therein, for receiving a plurality of keys 33, also engaging within keyways 34 formed in the openings or bores of the several last sections 25 to 30. Spacer sleeves 35 of accurately predetermined lengths are mounted upon the arbor 31, between the several plates or last sections 25 to 30, and the spacer sleeves serve to maintain the several last sections spaced apart longitudinally the proper distances, which distances are accurately predetermined at the drafting board. By virtue of their keyed connection with the arbor 31, the several last sections 25 to 30 are all accurately positioned circumferentially with respect to the longitudinal axis of the last and with respect to the arbor. End spacer sleeves 36 and 37 are mounted upon the arbor 31 outwardly of the endmost last sections 25 and 30, for positioning the endmost last sections against axial movement toward the ends of the arbor. One end of the arbor may be screw-threaded for the reception of a nut 38, serving to secure the last sections 25 to 30 and the sleeves 35, 36 and 37 upon the arbor 31. The opposite end of the arbor 31 may be provided with an enlarged shoulder 39, against which the adjacent end spacer sleeve 37 abuts.

The arrangement is such that the arbor 31, last sections 25 to 30 and spacer sleeves constitute a rotatable unit, simulating the usual handmade master model last, and serving as a pattern or guide for the model wheel 15 of the copying lathe.

The thus assembled simulated master model last is mounted between the center 22 and rotary chuck or socket 24 of the copying lathe, as shown in Figures 1 and 2, and an oversize wooden last block or "cob" 40 to be turned into the desired last model is positioned between the center 21 of the lathe and the rotary chuck 20 to be driven by the chuck. The arrangement is such that the simulated master model last comprising the last sections 25 to 30 and the last block 40 turn in unison in the copying lathe, and the heel ends of the last block 40 and simulated master model last are arranged innermost in the lathe in opposed relation, as shown.

When the lathe operates, the follower or model wheel 15 is brought to bear against the periphery of the first last section 30, as shown in Figure 1, and a first peripheral groove 41, arcuate in cross section is formed in the last block 40 near the heel end of the same. The depth of penetration of the cutter 16 is of course controlled by the model wheel 15, which rides upon the last section 30, and the bottom of the arcuate groove 41 accurately defines the peripheral shape of the last model being formed at the critical heel portion of the same. The model wheel 15 is then advanced by the operator to the second last section or plate 29 which now serves as a templet or guide for the model wheel, and the cutter 16 will likewise be advanced along the last block 40 to the proper position for forming the next arcuate groove 42 in the last block, for accurately defining the peripheral shape of the last model at the next critical point. In like manner, the model wheel 15 is successively advanced to ride upon the marginal edge or periphery of the other last sections or templets 28, 27, 26 and 25, and when this is done the cutter 16 successively forms in the last block 40 the additional arcuate grooves 43, 44, 45 and 46, and thereby establishes accurately the peripheral or cross sectional shapes of the last model being produced at the other critical points along the same.

When the formation of the several grooves 41 to 46 has been completed, the excess material of the block 40 between the grooves is removed, along an imaginary contour surface extending adjacent to the bottoms of the several grooves 41 to 46 at all peripheral points about the grooves. This finishing of the last model may be accomplished in the copying lathe with relatively rough cuts to produce a semifinished last model such as that illustrated in Figures 3 and 4 of the drawings, wherein most of the excess material between the grooves 41 to 46 has been removed. The finished or completed last model 47 illustrated in Figure 5 is finally produced by hand with a rasp or the like. Minor finishing operations such as dressing off the heel and toe extremities of the last model and sanding or polishing of the model may be performed in any preferred manner.

The important point is that the bottoms of the several grooves 41 to 46 establish the several critical cross sectional shapes for the sought last model, and it may be readily understood that the accuracy of the method may be increased by employing additional templets or last sections similar to the last sections 25 to 30 in between the critical last sections 25 to 30. Any desired number of additional last sections may be employed, in which case the lengths of the spacer sleeves 35 are altered to maintain the last sections properly spaced apart longitudinally upon the arbor 31. In any event, the last sections are assembled and keyed to the arbor in longitudinally spaced relation to form a rotary unit or pattern simulating the usual handmade master model last, and the simulated master model last guides the model wheel 15 of the copying lathe during the formation of the desired wooden last model from the last block 40, as described above.

In Figure 11 of the drawings I have shown a modification of my method, wherein the identical last lathe shown in connection with the first form of the invention is employed for producing the same end product or last model 47 from the same cob or last block 40. However, in the form of the invention illustrated by Figure 11, I mount upon the arbor 31 a plurality of relatively wide last sections or templets 48, 49, 50, 51, 52, 53 and 54, corresponding generally to the last sections 25 to 30, but being keyed to the arbor 31 in longitudinally opposed end to end contacting relation. With this arrangement, no spacer sleeves are needed between the several last sectoins making up the simulated master model last. The several contacting last sections 48 to 54 have peripheral or marginal shapes similar to the shapes of the last sections 25 to 30 and determining or establishing the peripheral shape of the finished model last 47 at a desired number of longitudinal points upon the same. I have shown the several contacting last sections 48 to 54 relatively thick, for the purpose of simplification, and it should be understood that the contacting last sections may be made much thinner and more numerous if desired. When this is done, the accuracy of the form of the method shown in Figure 11 will be correspondingly increased, and an increased number of peripheral grooves will be formed within the last block 40.

During the practice of the form of the method shown in Figure 11, the model wheel 15 is brought to bear successfully upon the peripheries of the contacting templets or last sections 48 to 54, and as the copying lathe turns the work, peripheral grooves 55, 56, 57, 58, 59 and 60 are formed in the last block 40, as shown. The finishing of the last model 47 in the lathe is now done in the identical manner described in connection with the first form of the invention. During the practice of the form of the method illustrated in Figure 11, while the model wheel 15 is bearing against the periphery of the particular last section, such as the section 54 in Figure 11, the side of the wheel 15 engages the corner of the next adjacent last section, such as the last section 53, this steadies or controls the location of the last wheel 15, and also positions the cutter element 16 for forming the particular groove in the last block 40. It will be evident from the above description that in the practice of this second form of the method, if the individual last sections on the arbor 31 are arranged in end to end contacting relation and are thin and numerous enough, a large number of peripheral grooves will be formed within the last block 40 and the last model 47 will be produced by the method with a high degree of accuracy.

In view of the more detailed description in connection with the first form of the invention, it is believed that no further description is necessary in connection with the modified form shown in Figure 11.

It is to be understood that the forms of the invention, herewith shown and described are to be taken as preferred examples of the same, and that various changes in the shape, size and arrangement of parts may be resorted to, without departing from the spirit of the invention or scope of the subjoined claims.

I claim:

1. A method of making a master model shoe last, comprising drawing irregular cross sectional shapes of the desired shoe last at a plurality of longitudinally spaced points along the last with respect to a common longitudinal axis through the last, forming a plurality of separate relatively thin templets having peripheral shapes conforming to the drawn cross sectional shapes, assembling the templets in spaced relation corresponding to said longitudinally spaced points along the last and holding the templets against individual endwise and rotational movement, rotating the assembled templets about said common longitudinal axis as a unitary pattern in a copy lathe, simultaneously turning an oversized last block in the copying lathe while the follower element of the lathe is held successively in engagement with the peripheries of the separate templets and thereby forming peripheral grooves in said block, the bottoms of the grooves establishing the cross sectional shapes of the master model shoe last at longitudinally spaced points along the same corresponding to the spacing of said templets, and then removing the portions of the oversized last block between said grooves along an imaginary contour surface extending adjacent to the bottoms of the several grooves for completing the master model shoe last.

2. A method of making a master model shoe last, comprising forming a plurality of separate relatively thin templets having irregular peripheries for establishing cross sectional shapes of the desired master model shoe last at a plurality of longitudinally spaced points along the same with respect to a common longitudinal axis through the shoe last, assembling the templets in spaced relation corresponding to said longitudinally spaced points along the shoe last and holding the templets against individual endwise and rotational movement, rotating the assembled templets about said common longitudinal axis as a unitary pattern in a copy lathe, simultaneously turning an oversized last block in the copying lathe while the follower element of the lathe is held successively in engagement with the peripheries of the templets and thereby forming peripheral grooves in said block which are arcuate in cross section, the bottoms of the arcuate grooves establishing the cross sectional shapes of the master model shoe last at longitudinally spaced points along the same corresponding to the spacing of said templets, and then removing the portions of the oversized last block between said grooves along an imaginary contour surface extending adjacent to the bottoms of the arcuate grooves for completing the master model shoe last.

BURDELL D. SPENCER.

References Cited in the file of this patent

UNITED STATES PATENTS

| Number | Name | Date |
|---|---|---|
| 993,405 | Prindle | May 30, 1911 |
| 1,277,689 | Boda | Sept. 3, 1918 |
| 1,540,801 | O'Neel | June 9, 1925 |
| 1,860,723 | Ryan | May 31, 1932 |
| 2,188,502 | Emmons | Jan. 30, 1940 |